UNITED STATES PATENT OFFICE.

GERHARD NICOLAAS VIS, OF SCHWEIZERHALLE, NEAR BASLE, SWITZERLAND.

PROCESS OF PURIFYING BRINE.

SPECIFICATION forming part of Letters Patent No. 675,686, dated June 4, 1901.

Application filed December 19, 1900. Serial No. 40,442. (No specimens.)

*To all whom it may concern:*

Be it known that I, GERHARD NICOLAAS VIS, doctor of philosophy and chemist, a subject of the Queen of the Netherlands, residing at Schweizerhalle, near Basle, Switzerland, have invented a new and useful Process for the Purification of Brine; and I do hereby declare that the following is a full, clear, and exact description of my invention, which will enable others skilled in the art to which it appertains to make and use the same.

The present invention relates to the purification of brine, and has for its special object to enable the gypsum dissolved in the brine to be separated therefrom in a manner more advantageous than heretofore.

In the specification of the United States Patent No. 658,303, dated September 18, 1900, I have shown that sulfates, which are more easily soluble than gypsum or calcium sulfate—such as sodium sulfate, (Glauber salt,) aluminium sulfate, (alum,) and the like—have the property when added to brine in proper excess of causing gypsum to be separated out by a merely physical action, which may be called "salting out," the proportion of gypsum thus salted out depending on the proportion of salting-out sulfate added—the greater the latter proportion the more gypsum will be separated out. In order to free the brine from the gypsum up to little short of the total amount of the latter, it becomes, however, necessary to apply such large quantities of the salting-out sulfates that the process is rendered impracticable. For this reason it is preferred, as described in said specification, to use only such a proportion of easily-soluble sulfate as is required for salting out the greater part of the gypsum and to precipitate the remainder by the chemical way—for instance, by mixing the brine with sodium carbonate, which reacts with the dissolved remainder of gypsum with the formation of sodium sulfate and calcium carbonate, the former entering into solution and the latter separating out. The liquor is filtered off from the precipitate and evaporated to separate out the sodium chlorid, the remaining mother-lye, which contains the greater part of the salting-out sulfate added in the salting-out step and the sodium sulfate formed in the precipitating step, being utilized for the purification of a fresh quantity of brine. On using this method of purifying brine from its gypsum, salt-works find themselves under the necessity of taking the sodium carbonate from the market. It is the object of the present invention to reduce the expenditure of sodium carbonate as much as possible, and this is realized by the hereinafter-described process of producing the sodium carbonate within the brine itself by means of sodium sulfate which is recovered.

It is a reaction well known in theory that sodium sulfate (Glauber salt) and calcium hydroxid (slaked lime) decompose each other with the formation of sodium hydroxid and calcium sulfate according to the equation:

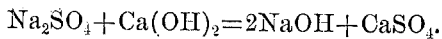

$$Na_2SO_4 + Ca(OH)_2 = 2NaOH + CaSO_4.$$

Attempts to utilize this reaction industrially in the manufacture of caustic soda turned out unsuccessfully, as is well known, for the reason that when carried out under ordinary—that is, atmospheric—pressure the reaction is confined to such narrow limits that the yield of caustic soda is not remunerative.

It has now been discovered by me that if Glauber salt and slaked lime are allowed to react with each other in brine under atmospheric pressure approximately as much as fifteen per cent. of the sodium sulfate employed is converted into sodium hydroxid or "causticised." This hitherto-unknown fact enables the removal from the brine of the remainder of gypsum left behind in solution in the "salting-out step" to be effected by means of sodium carbonate in a very advantageous manner by mixing the brine with sulfate of sodium and slaked lime and passing carbonic acid into the brine after completion of the caustification of the sodium sulfate.

The present invention consequently consists in effecting the final removal of the remainder of gypsum from brine previously treated with easily-soluble sulfates to salt out the greater part of its gypsum by causing a double decomposition to take place within the brine between sodium sulfate and calcium hydroxid and converting the resultant sodium hydroxid into sodium carbonate by introducing carbonic acid—for instance, furnace-gases. The sodium carbonate thus formed converts the residual gypsum into calcium carbonate, which separates out, while it is itself converted into sodium sulfate, which enters in solution, the sodium sulfate used for producing the sodium carbonate being thus recovered.

The advantage of this invention consists, on the one hand, in the smaller cost of purification as regards the sodium carbonate required and, on the other hand, in the simultaneous purification of the brine from salts of magnesium and of heavy metals—calcium bicarbonate and the like—through the agency of the calcic hydroxid.

In order to carry out the invention, so much sulfate of sodium (Glauber salt) is added to the brine that after reaction with chlorid of calcium, bromid of calcium, and the like salts present in the brine that are converted into gypsum (which separates out) there are present fifteen to twenty kilograms of undecomposed sodium sulfate per cubic meter. This proportion has proved to be that which gives the best result, but may be varied according to circumstances. Calcium hydroxid (slaked lime) is added to the brine in such an excess over the proportion that is used up in converting and precipitating bicarbonates, free carbonic acid, magnesium, and heavy-metal salts which are present in the brine and react with the calcium hydroxid that about 1.5 kilograms of calcic hydroxid per cubic meter of brine remain available for reacting with sodium sulfate. The mixture of brine, sodium sulfate, and calcic hydroxid is kept in a state of relative movement of its particles, preferably by agitation, for about twenty-five hours, when about fifteen per cent. of the said proportion of fifteen to twenty kilograms of sodium sulfate per cubic meter of brine is found to be converted into sodium hydroxid. The brine is filtered and then treated with carbonic acid (for instance, by passing furnace-gases through it) until a sample which has been filtered remains clear on being treated with carbonic acid and boiled. If the sample becomes turbid, the carbonic-acid supply to the brine is continued until another sample remains clear on being tested. Excess of carbonic acid should, however, be avoided, as otherwise soluble calcium bicarbonate will be formed. The brine is now perfectly free from calcium compounds. It is separated from the precipitated calcium carbonate by filtration and evaporated to separate out common salt. The residual liquor or mother-lye, which contains the greater part of the sodium sulfate added to the brine, is employed for operating the purification of a fresh quantity of brine.

The process may also be carried out by first mixing the brine with the sodium sulfate, stirring for about twenty-five hours, and then mixing the slaked lime and agitating for another five hours. If preferred, the brine can be separated by filtration from the salted-out gypsum before the slaked lime is added. Instead of by agitating, the relative movement of the particles of the brine and the reagents added may be produced by heating the mixture or both by agitating and heating it.

Obviously instead of sodium sulfate other sulfates may be used which are capable of being causticised by means of calcic hydroxid and of forming soluble carbonates, such as sulfate of potassium or sulfate of ammonium, &c.

As an example may serve the purification of the brine of the Schweizerhalle salt-works near Basle, Switzerland. This brine contains per cubic meter 5.60 $CaSO_4$, (sulfate of calcium,) 0.344 $CaH_2(CO_3)_2$, (bicarbonate of calcium,) 0.112 $CO_2$, (carbonic acid in the uncombined state,) 0.370 $MgCL_2$, (chlorid of magnesium,) and 0.107 $Na_2SO_4$, (sulfate of sodium,) and is saturated with $Na_2Cl$, (chlorid of sodium.) To each cubic meter of this brine are added two kilograms of quicklime and fifteen or twenty kilograms of dry sulfate of sodium, (Glauber salt.) After stirring for five hours, one hundred cubic centimeters of brine show a percentage of free alkali, which corresponds, when employing fifteen kilograms of sodium sulfate per cubic meter of brine, to three cubic centimeters of normal hydrochloric acid, (or to 3.95 cubic centimeters of such acid when employing twenty kilograms of sodium sulfate per cubic meter of brine.) After stirring for another twenty-five hours the brine manifests the same degree of alkalinity. The amount of gypsum still contained in the brine proves to correspond to 0.0847 CaO in one hundred cubic centimeters of the brine if fifteen kilograms of sodium sulfate per cubic meter of brine or to 0.0700 CaO if twenty kilograms of sulfate of sodium have been added. After treating with carbonic acid until a clear sample is obtained and then filtering the brine is perfectly free from calcium. The aforesaid alkalinity resulted from the presence of sodium hydroxid and not from dissolved calcium hydroxid. This is proved by treating an equal quantity of the same brine with the same quantity of Glauber salt, but without the admixture of calcium hydroxid, and stirring for twenty-five hours, when the brine shows approximately the same amount of dissolved calcium—that is to say, 0.093 CaO per cubic centimeter if fifteen kilograms of sodium sulfate per cubic meter of brine were added and 0.0697 CaO if twenty kilograms of sodium sulfate were used. Consequently fourteen or fifteen per cent. of the added sodium sulfate had been converted into sodium carbonate, which quantity is sufficient to precipitate as insoluble carbonate all the gypsum remaining in solution.

What I claim as my invention is—

1. The process for the purification of brine which consists in adding to the brine an excess of sulfates which are more soluble than gypsum and an excess of calcium hydroxid, maintaining the particles of the mixture in a state of relative movement, separating the precipitate from the liquor, neutralizing the alkalinity of the latter with carbonic acid, and filtering, substantially as and for the purpose stated.

2. The process for the purification of brine which consists in adding to the brine such an excess of sodium sulfate that after conversion into gypsum of the calcium chlorid, calcium bromid and the like there are fifteen to twenty kilograms of undecomposed sulfate of sodium per cubic meter of brine, and such an excess of calcium hydroxid that after conversion of the bicarbonates, carbonic acid, magnesium and heavy-metal salts there are about 1.5 kilograms of undecomposed calcium hydroxid, maintaining the particles of the mixture in a state of relative movement, separating the precipitate from the liquor, neutralizing the alkalinity of the latter with carbonic acid, and filtering, substantially as and for the purpose stated.

In testimony whereof I have hereunto set my hand in presence of two subscribing witnesses.

GERHARD NICOLAAS VIS.

Witnesses:
   GEO. GIFFORD,
   JOHN G. PLATNER.